United States Patent
Hall et al.

(10) Patent No.: US 9,068,410 B2
(45) Date of Patent: Jun. 30, 2015

(54) DENSE DIAMOND BODY

(75) Inventors: David R. Hall, Provo, UT (US); H. Tracy Hall, Jr., Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 1150 days.

(21) Appl. No.: 12/493,013

(22) Filed: Jun. 26, 2009

(65) Prior Publication Data

US 2009/0263308 A1 Oct. 22, 2009

Related U.S. Application Data

(63) Continuation-in-part of application No. 11/691,978, filed on Mar. 27, 2007, now Pat. No. 7,588,102, which is a continuation-in-part of application No. 11/673,634, filed on Feb. 12, 2007, now Pat. No. 8,109,349, which is a continuation-in-part of application No. 11/668,254, filed on Jan. 29, 2007, now Pat. No. 7,353,893, which is a continuation-in-part of application No. 11/553,338, filed on Oct. 26, 2006, now Pat. No. 7,665,552.

(51) Int. Cl.
| | |
|---|---|
| *B01J 3/06* | (2006.01) |
| *B24D 3/06* | (2006.01) |
| *C01B 31/06* | (2006.01) |
| *E21B 10/567* | (2006.01) |
| *C04B 35/52* | (2006.01) |
| *C04B 35/645* | (2006.01) |
| *E21C 35/183* | (2006.01) |

(52) U.S. Cl.
CPC .............. *E21B 10/567* (2013.01); *B01J 3/062* (2013.01); *B01J 2203/062* (2013.01); *B01J 2203/0655* (2013.01); *B01J 2203/0685* (2013.01); *C01B 31/065* (2013.01); *C04B 35/52* (2013.01); *C04B 35/645* (2013.01); *C04B 2235/427* (2013.01); *E21C 35/183* (2013.01)

(58) Field of Classification Search
None
See application file for complete search history.

(56) References Cited

U.S. PATENT DOCUMENTS

| | | |
|---|---|---|
| 465,103 A | 12/1891 | Wegner |
| 616,118 A | 12/1898 | Kunhe |
| 946,060 A | 1/1910 | Looker |
| 1,116,154 A | 11/1914 | Stowers |
| 1,183,630 A | 5/1916 | Bryson |

(Continued)

FOREIGN PATENT DOCUMENTS

| | | |
|---|---|---|
| DE | 33 07 910 | 9/1984 |
| DE | 35 00 261 | 7/1986 |

(Continued)

OTHER PUBLICATIONS

Chaturvedi et al., Diffusion Brazing of Cast Inconel 738 Superalloy, Sep. 2005, Journal of Materials Online (http://www.azom.com/details.asp?ArticleID=2995).

(Continued)

*Primary Examiner* — Guinever Gregorio
(74) *Attorney, Agent, or Firm* — Osha Liang LLP

(57) ABSTRACT

A method of making a dense diamond body comprises the steps of: forming a sintered polycrystalline diamond body with the use of a catalyst; forming voids in the body by removing at least some of the catalyst; and reducing the overall volume of voids by applying pressure and temperature to the body in a vessel substantially free of additional catalysts.

20 Claims, 13 Drawing Sheets

(56) References Cited

U.S. PATENT DOCUMENTS

| | | |
|---|---|---|
| 1,189,560 A | 7/1916 | Gondos |
| 1,360,908 A | 11/1920 | Everson |
| 1,387,733 A | 8/1921 | Midgett |
| 1,460,671 A | 7/1923 | Hebsacker |
| 1,544,757 A | 7/1925 | Hufford et al. |
| 1,821,474 A | 9/1931 | Mercer |
| 1,879,177 A | 9/1932 | Gault |
| 2,004,315 A | 6/1935 | Fean |
| 2,054,255 A | 9/1936 | Howard |
| 2,064,255 A | 12/1936 | Garfield |
| 2,124,438 A | 7/1938 | Struk et al. |
| 2,169,223 A | 8/1939 | Christian |
| 2,218,130 A | 10/1940 | Court |
| 2,320,136 A | 5/1943 | Kammerer |
| 2,466,991 A | 4/1949 | Kammerer |
| 2,540,464 A | 2/1951 | Stokes |
| 2,544,036 A | 3/1951 | Kammerer |
| 2,755,071 A | 7/1956 | Kammerer |
| 2,776,819 A | 1/1957 | Brown |
| 2,819,043 A | 1/1958 | Henderson |
| 2,838,284 A | 6/1958 | Austin |
| 2,894,722 A | 7/1959 | Buttolph |
| 2,901,223 A | 8/1959 | Scott |
| 2,963,102 A | 12/1960 | Smith |
| 3,135,341 A | 6/1964 | Ritter |
| 3,254,392 A | 6/1966 | Novkov |
| 3,294,186 A | 12/1966 | Buell |
| 3,301,339 A | 1/1967 | Pennebaker, Jr. |
| 3,379,264 A | 4/1968 | Cox |
| 3,397,012 A | 8/1968 | Krekeler |
| 3,429,390 A | 2/1969 | Bennett |
| 3,493,165 A | 2/1970 | Schonfeld |
| 3,583,504 A | 6/1971 | Aaulund |
| 3,626,775 A | 12/1971 | Gentry |
| 3,745,396 A | 7/1973 | Quintal et al. |
| 3,745,623 A * | 7/1973 | Wentorf et al. ............... 407/119 |
| 3,746,396 A | 7/1973 | Radd |
| 3,764,493 A | 10/1973 | Rosar et al. |
| 3,800,891 A | 4/1974 | White et al. |
| 3,807,804 A | 4/1974 | Kniff |
| 3,821,993 A | 7/1974 | Kniff et al. |
| 3,830,321 A | 8/1974 | McKenry et al. |
| 3,932,952 A | 1/1976 | Helton |
| 3,945,681 A | 3/1976 | White |
| 3,955,635 A | 5/1976 | Skidmore |
| 3,960,223 A | 6/1976 | Kleine |
| 4,005,914 A | 2/1977 | Newman |
| 4,006,936 A | 2/1977 | Crabiel |
| 4,081,042 A | 3/1978 | Johnson et al. |
| 4,096,917 A | 6/1978 | Harris |
| 4,098,362 A | 7/1978 | Bonnice |
| 4,106,577 A | 8/1978 | Summers |
| 4,109,737 A | 8/1978 | Bovenkerk |
| 4,140,004 A | 2/1979 | Smith et al. |
| 4,156,329 A | 5/1979 | Daniels et al. |
| 4,176,723 A | 12/1979 | Arceneaux |
| 4,199,035 A | 4/1980 | Thompson |
| 4,201,421 A | 5/1980 | Den Besten |
| 4,211,508 A | 7/1980 | Dill et al. |
| 4,224,380 A | 9/1980 | Bovenkerk et al. |
| 4,253,533 A | 3/1981 | Baker, III |
| 4,268,089 A | 5/1981 | Spence et al. |
| 4,277,106 A | 7/1981 | Sahley |
| 4,280,573 A | 7/1981 | Sudnishnikov et al. |
| 4,304,312 A | 12/1981 | Larsson |
| 4,307,786 A | 12/1981 | Evans |
| D264,217 S | 5/1982 | Prause et al. |
| 4,333,902 A | 6/1982 | Hara |
| 4,333,986 A | 6/1982 | Tsuji et al. |
| 4,337,980 A | 7/1982 | Krekeler |
| 4,390,992 A | 6/1983 | Judd |
| 4,397,361 A | 8/1983 | Langford, Jr. |
| 4,412,980 A | 11/1983 | Tsuji et al. |
| 4,416,339 A | 11/1983 | Baker et al. |
| 4,425,315 A | 1/1984 | Tsuji et al. |
| 4,439,250 A | 3/1984 | Acharya et al. |
| 4,445,580 A | 5/1984 | Sahley |
| 4,448,269 A | 5/1984 | Ishikawa et al. |
| 4,465,221 A | 8/1984 | Schmidt |
| 4,481,016 A | 11/1984 | Campbell et al. |
| 4,484,644 A | 11/1984 | Cook et al. |
| 4,484,783 A | 11/1984 | Emmerich |
| 4,489,986 A | 12/1984 | Dziak |
| 4,499,795 A | 2/1985 | Radtke |
| 4,525,178 A | 6/1985 | Hall |
| 4,531,592 A | 7/1985 | Hayatdavoudi |
| 4,535,853 A | 8/1985 | Ippolito et al. |
| 4,538,691 A | 9/1985 | Dennis |
| 4,566,545 A | 1/1986 | Story et al. |
| 4,574,895 A | 3/1986 | Dolezal et al. |
| 4,599,731 A | 7/1986 | Ware et al. |
| 4,604,106 A | 8/1986 | Hall |
| 4,627,503 A | 12/1986 | Horton |
| 4,636,253 A | 1/1987 | Nakai et al. |
| 4,636,353 A | 1/1987 | Seon |
| 4,640,374 A | 2/1987 | Dennis |
| 4,647,111 A | 3/1987 | Bronder et al. |
| 4,647,546 A | 3/1987 | Hall, Jr. et al. |
| 4,650,776 A | 3/1987 | Cerceau et al. |
| 4,662,348 A | 5/1987 | Hall et al. |
| 4,664,705 A * | 5/1987 | Horton et al. ............... 75/243 |
| 4,678,237 A | 7/1987 | Collin |
| 4,682,987 A | 7/1987 | Brady et al. |
| 4,684,176 A | 8/1987 | Den Besten et al. |
| 4,688,856 A | 8/1987 | Elfgen |
| 4,690,691 A | 9/1987 | Komanduri |
| 4,694,918 A | 9/1987 | Hall |
| 4,725,098 A | 2/1988 | Beach |
| 4,726,718 A | 2/1988 | Meskin et al. |
| 4,729,440 A | 3/1988 | Hall |
| 4,729,603 A | 3/1988 | Elfgen |
| 4,765,686 A | 8/1988 | Adams |
| 4,765,687 A | 8/1988 | Parrott |
| 4,776,862 A | 10/1988 | Wiand |
| 4,852,672 A | 8/1989 | Behrens |
| 4,880,154 A | 11/1989 | Tank |
| 4,889,017 A | 12/1989 | Fuller et al. |
| D305,871 S | 2/1990 | Geiger |
| 4,921,310 A | 5/1990 | Hedlund et al. |
| 4,932,723 A | 6/1990 | Mills |
| 4,940,099 A | 7/1990 | Deane et al. |
| 4,940,288 A | 7/1990 | Stiffler et al. |
| 4,944,559 A | 7/1990 | Sionnet et al. |
| 4,944,772 A | 7/1990 | Cho |
| 4,951,762 A | 8/1990 | Lundell |
| 4,956,238 A | 9/1990 | Griffin |
| 4,962,822 A | 10/1990 | Pascale |
| 4,981,184 A | 1/1991 | Knowlton et al. |
| 5,007,685 A | 4/1991 | Beach et al. |
| 5,009,273 A | 4/1991 | Grabinski |
| 5,011,515 A | 4/1991 | Frushour |
| 5,027,914 A | 7/1991 | Wilson |
| 5,038,873 A | 8/1991 | Jurgens |
| D324,056 S | 2/1992 | Frazee |
| D324,226 S | 2/1992 | Frazee |
| 5,088,797 A | 2/1992 | O'Neill |
| 5,112,165 A | 5/1992 | Hedlund et al. |
| 5,119,714 A | 6/1992 | Scott et al. |
| 5,119,892 A | 6/1992 | Clegg et al. |
| 5,141,063 A | 8/1992 | Quesenbury |
| 5,141,289 A | 8/1992 | Stiffler |
| D329,809 S | 9/1992 | Bloomfield |
| 5,154,245 A | 10/1992 | Waldenstrom |
| 5,186,268 A | 2/1993 | Clegg |
| 5,186,892 A | 2/1993 | Pope |
| 5,222,566 A | 6/1993 | Taylor et al. |
| 5,248,006 A | 9/1993 | Scott et al. |
| 5,251,964 A | 10/1993 | Ojanen |
| 5,255,749 A | 10/1993 | Bumpurs et al. |
| 5,261,499 A | 11/1993 | Grubb |
| 5,265,682 A | 11/1993 | Russell et al. |
| D342,268 S | 12/1993 | Meyer |
| 5,303,984 A | 4/1994 | Ojanen |
| 5,304,342 A | 4/1994 | Hall, Jr. et al. |

(56) References Cited

U.S. PATENT DOCUMENTS

| | | |
|---|---|---|
| 5,332,348 A | 7/1994 | Lemelson |
| 5,351,770 A | 10/1994 | Cawthorne et al. |
| 5,361,859 A | 11/1994 | Tibbitts |
| 5,374,319 A | 12/1994 | Stueber et al. |
| D357,485 S | 4/1995 | Mattsson et al. |
| 5,410,303 A | 4/1995 | Comeau et al. |
| 5,417,292 A | 5/1995 | Polakoff |
| 5,417,475 A | 5/1995 | Graham et al. |
| 5,423,389 A | 6/1995 | Warren et al. |
| 5,447,208 A | 9/1995 | Lund |
| 5,494,477 A | 2/1996 | Flood et al. |
| 5,507,357 A | 4/1996 | Hult et al. |
| D371,374 S | 7/1996 | Fischer et al. |
| 5,533,582 A | 7/1996 | Tibbitts |
| 5,535,839 A | 7/1996 | Brady |
| 5,542,993 A | 8/1996 | Rabinkin |
| 5,544,713 A | 8/1996 | Dennis |
| 5,560,440 A | 10/1996 | Tibbitts |
| 5,568,838 A | 10/1996 | Struthers et al. |
| 5,653,300 A | 8/1997 | Lund |
| 5,655,614 A | 8/1997 | Azar |
| 5,662,720 A | 9/1997 | O'Tigheamaigh |
| 5,678,644 A | 10/1997 | Fielder |
| 5,709,279 A | 1/1998 | Dennis |
| 5,720,528 A | 2/1998 | Ritchey |
| 5,732,784 A | 3/1998 | Nelson |
| 5,738,698 A | 4/1998 | Kapoor et al. |
| 5,794,728 A | 8/1998 | Palmberg |
| 5,811,944 A | 9/1998 | Sampayan et al. |
| 5,823,632 A | 10/1998 | Burkett |
| 5,837,071 A | 11/1998 | Andersson et al. |
| 5,845,547 A | 12/1998 | Sollami |
| 5,848,657 A | 12/1998 | Flood et al. |
| 5,871,060 A | 2/1999 | Jensen et al. |
| 5,875,862 A | 3/1999 | Jurewicz |
| 5,884,979 A | 3/1999 | Latham |
| 5,890,552 A | 4/1999 | Scott et al. |
| 5,896,938 A | 4/1999 | 'Moeney et al. |
| 5,914,055 A | 6/1999 | Roberts et al. |
| 5,934,542 A | 8/1999 | Nakamura et al. |
| 5,935,718 A | 8/1999 | Demo et al. |
| 5,944,129 A | 8/1999 | Jensen |
| 5,947,215 A | 9/1999 | Lundell |
| 5,950,743 A | 9/1999 | Cox |
| 5,957,223 A | 9/1999 | Doster et al. |
| 5,957,225 A | 9/1999 | Sinor |
| 5,967,247 A | 10/1999 | Pessier |
| 5,967,250 A | 10/1999 | Lund |
| 5,979,571 A | 11/1999 | Scott et al. |
| 5,992,405 A | 11/1999 | Sollami |
| 5,992,547 A | 11/1999 | Caraway et al. |
| 5,992,548 A | 11/1999 | Silva et al. |
| 6,000,483 A | 12/1999 | Jurewicz et al. |
| 6,003,623 A | 12/1999 | Miess |
| 6,006,846 A | 12/1999 | Tibbitts et al. |
| 6,018,729 A | 1/2000 | Zacharia et al. |
| 6,019,434 A | 2/2000 | Emmerich |
| 6,021,859 A | 2/2000 | Tibbitts et al. |
| 6,039,131 A | 3/2000 | Beaton |
| 6,041,875 A | 3/2000 | Rai et al. |
| 6,044,920 A | 4/2000 | Massa et al. |
| 6,051,079 A | 4/2000 | Andersson et al. |
| 6,056,911 A | 5/2000 | Griffin |
| 6,065,552 A | 5/2000 | Scott et al. |
| 6,068,913 A | 5/2000 | Cho et al. |
| 6,098,730 A | 8/2000 | Scott et al. |
| 6,113,195 A | 9/2000 | Mercier et al. |
| 6,131,675 A | 10/2000 | Anderson |
| 6,150,822 A | 11/2000 | Hong et al. |
| 6,170,917 B1 | 1/2001 | Heinrich et al. |
| 6,186,251 B1 | 2/2001 | Butcher |
| 6,193,770 B1 | 2/2001 | Sung |
| 6,196,340 B1 | 3/2001 | Jensen |
| 6,196,636 B1 | 3/2001 | Mills |
| 6,196,910 B1 | 3/2001 | Johnson |
| 6,199,645 B1 | 3/2001 | Andersson et al. |
| 6,199,956 B1 | 3/2001 | Kammerer |
| 6,202,761 B1 | 3/2001 | Forney |
| 6,213,226 B1 | 4/2001 | Eppink et al. |
| 6,216,805 B1 | 4/2001 | Lays et al. |
| 6,220,375 B1 | 4/2001 | Butcher et al. |
| 6,220,376 B1 | 4/2001 | Lundell |
| 6,223,824 B1 | 5/2001 | Moyes |
| 6,223,974 B1 | 5/2001 | Unde |
| 6,257,673 B1 | 7/2001 | Markham et al. |
| 6,258,139 B1 | 7/2001 | Jensen |
| 6,260,639 B1 | 7/2001 | Yong et al. |
| 6,269,893 B1 | 8/2001 | Beaton et al. |
| 6,270,165 B1 | 8/2001 | Peay |
| 6,272,748 B1 | 8/2001 | Smyth |
| 6,290,008 B1 | 9/2001 | Portwood et al. |
| 6,296,069 B1 | 10/2001 | Lamine et al. |
| 6,302,224 B1 | 10/2001 | Sherwood, Jr. |
| 6,302,225 B1 | 10/2001 | Yoshida et al. |
| 6,332,503 B1 | 12/2001 | Pessier et al. |
| 6,340,064 B2 | 1/2002 | Fielder et al. |
| 6,341,823 B1 | 1/2002 | Sollami |
| 6,354,771 B1 | 3/2002 | Bauschulte et al. |
| 6,364,034 B1 | 4/2002 | Schoeffler |
| 6,364,420 B1 | 4/2002 | Sollami |
| 6,371,567 B1 | 4/2002 | Sollami |
| 6,375,272 B1 | 4/2002 | Ojanen |
| 6,375,706 B2 | 4/2002 | Kembaiyan et al. |
| 6,394,200 B1 | 5/2002 | Watson et al. |
| 6,408,052 B1 | 6/2002 | McGeoch |
| 6,408,959 B2 | 6/2002 | Bertagnolli et al. |
| 6,419,278 B1 | 7/2002 | Cunningham |
| 6,429,398 B1 | 8/2002 | Legoupil et al. |
| 6,439,326 B1 | 8/2002 | Huang et al. |
| 6,460,637 B1 | 10/2002 | Siracki et al. |
| 6,468,368 B1 | 10/2002 | Merrick et al. |
| 6,474,425 B1 | 11/2002 | Truax et al. |
| 6,478,383 B1 | 11/2002 | Ojanen et al. |
| 6,481,803 B2 | 11/2002 | Ritchey |
| 6,484,825 B2 | 11/2002 | Watson et al. |
| 6,484,826 B1 | 11/2002 | Anderson et al. |
| 6,499,547 B2 | 12/2002 | Scott et al. |
| 6,508,318 B1 | 1/2003 | Linden et al. |
| 6,510,906 B1 | 1/2003 | Richert et al. |
| 6,513,606 B1 | 2/2003 | Krueger |
| 6,517,902 B2 | 2/2003 | Drake et al. |
| 6,533,050 B2 | 3/2003 | Molloy |
| 6,561,293 B2 | 5/2003 | Minikus et al. |
| 6,562,462 B2 | 5/2003 | Griffin et al. |
| D477,225 S | 7/2003 | Pinnavaia |
| 6,585,326 B2 | 7/2003 | Sollami |
| 6,592,985 B2 | 7/2003 | Griffin et al. |
| 6,594,881 B2 | 7/2003 | Tibbitts |
| 6,596,225 B1 | 7/2003 | Pope et al. |
| 6,601,454 B1 | 8/2003 | Botnan |
| 6,601,662 B2 | 8/2003 | Matthias et al. |
| 6,622,803 B2 | 9/2003 | Harvey |
| 6,668,949 B1 | 12/2003 | Rives |
| 6,672,406 B2 | 1/2004 | Beuershausen |
| 6,685,273 B1 | 2/2004 | Sollami |
| 6,692,083 B2 | 2/2004 | Latham |
| 6,702,393 B2 | 3/2004 | Mercier |
| 6,709,065 B2 | 3/2004 | Peay et al. |
| 6,711,060 B2 | 3/2004 | Sakakibara |
| 6,719,074 B2 | 4/2004 | Tsuda et al. |
| 6,729,420 B2 | 5/2004 | Mensa-Wilmot |
| 6,732,817 B2 | 5/2004 | Dewey et al. |
| 6,732,914 B2 | 5/2004 | Cadden et al. |
| 6,733,087 B2 | 5/2004 | Hall et al. |
| 6,739,327 B2 | 5/2004 | Sollami |
| 6,749,033 B2 | 6/2004 | Griffin et al. |
| 6,758,530 B2 | 7/2004 | Sollami |
| D494,031 S | 8/2004 | Moore, Jr. |
| D494,064 S | 8/2004 | Hook |
| 6,786,557 B2 | 9/2004 | Montgomery, Jr. |
| 6,802,676 B2 | 10/2004 | Noggle |
| 6,822,579 B2 | 11/2004 | Goswami et al. |
| 6,824,225 B2 | 11/2004 | Stiffler |
| 6,846,045 B2 | 1/2005 | Sollami |

(56) References Cited

U.S. PATENT DOCUMENTS

| | | |
|---|---|---|
| 6,851,758 B2 | 2/2005 | Beach |
| 6,854,810 B2 | 2/2005 | Montgomery, Jr. |
| 6,861,137 B2 | 3/2005 | Griffin et al. |
| 6,878,447 B2 | 4/2005 | Griffin |
| 6,880,744 B2 | 4/2005 | Noro et al. |
| 6,889,890 B2 | 5/2005 | Yamazaki et al. |
| 6,929,076 B2 | 8/2005 | Fanuel et al. |
| 6,933,049 B2 | 8/2005 | Wan et al. |
| 6,953,096 B2 | 10/2005 | Gledhill et al. |
| 6,959,765 B2 | 11/2005 | Bell |
| 6,962,395 B2 | 11/2005 | Mouthaan |
| 6,966,611 B1 | 11/2005 | Sollami |
| 6,994,404 B1 | 2/2006 | Sollami |
| 7,048,081 B2 | 5/2006 | Smith et al. |
| 7,152,703 B2 | 12/2006 | Meiners et al. |
| 7,204,560 B2 | 4/2007 | Mercier et al. |
| D547,652 S | 7/2007 | Kerman et al. |
| D560,699 S | 1/2008 | Omi |
| 7,350,601 B2 | 4/2008 | Belnap et al. |
| 7,377,341 B2 * | 5/2008 | Middlemiss et al. ......... 175/374 |
| 7,380,888 B2 | 6/2008 | Ojanen |
| 7,396,086 B1 | 7/2008 | Hall et al. |
| 7,493,973 B2 * | 2/2009 | Keshavan et al. ............. 175/434 |
| 7,543,662 B2 | 6/2009 | Belnap et al. |
| 7,556,852 B2 | 7/2009 | Aoki |
| 7,575,425 B2 | 8/2009 | Hall et al. |
| 7,592,077 B2 | 9/2009 | Gates, Jr. et al. |
| 7,665,552 B2 | 2/2010 | Hall |
| 7,703,559 B2 | 4/2010 | Shen et al. |
| 7,730,977 B2 | 6/2010 | Achilles |
| 7,757,785 B2 | 7/2010 | Zhang et al. |
| 7,798,258 B2 | 9/2010 | Singh et al. |
| 8,309,050 B2 * | 11/2012 | Keshavan et al. ............. 423/446 |
| 2001/0004946 A1 | 6/2001 | Jensen |
| 2002/0074851 A1 | 6/2002 | Montgomery, Jr. |
| 2002/0153175 A1 | 10/2002 | Ojanen |
| 2002/0175555 A1 | 11/2002 | Mercier |
| 2003/0044800 A1 | 3/2003 | Connelly et al. |
| 2003/0079565 A1 | 5/2003 | Liang et al. |
| 2003/0141350 A1 | 7/2003 | Noro et al. |
| 2003/0209366 A1 | 11/2003 | McAlvain |
| 2003/0213621 A1 | 11/2003 | Britten |
| 2003/0217869 A1 | 11/2003 | Snyder et al. |
| 2003/0234280 A1 | 12/2003 | Cadden et al. |
| 2004/0026132 A1 | 2/2004 | Hall |
| 2004/0026983 A1 | 2/2004 | McAlvain |
| 2004/0065484 A1 | 4/2004 | McAlvain |
| 2004/0155096 A1 | 8/2004 | Zimmerman et al. |
| 2004/0238221 A1 | 12/2004 | Ruina et al. |
| 2004/0256155 A1 | 12/2004 | Kriesels |
| 2004/0256442 A1 | 12/2004 | Gates, Jr. |
| 2005/0044800 A1 | 3/2005 | Hall |
| 2005/0159840 A1 | 7/2005 | Lin et al. |
| 2005/0173966 A1 | 8/2005 | Mouthaan |
| 2005/0263327 A1 | 12/2005 | Meiners et al. |
| 2006/0060391 A1 | 3/2006 | Eyre et al. |
| 2006/0086537 A1 | 4/2006 | Dennis |
| 2006/0086540 A1 | 4/2006 | Griffin |
| 2006/0162969 A1 | 7/2006 | Belnap et al. |
| 2006/0180354 A1 | 8/2006 | Belnap et al. |
| 2006/0186724 A1 | 8/2006 | Stehney |
| 2006/0237236 A1 | 10/2006 | Sreshta et al. |
| 2007/0193782 A1 | 8/2007 | Fang |
| 2007/0278017 A1 | 12/2007 | Shen et al. |
| 2008/0006448 A1 | 1/2008 | Zhang et al. |
| 2008/0053710 A1 | 3/2008 | Moss |
| 2008/0073126 A1 | 3/2008 | Shen et al. |
| 2008/0073127 A1 | 3/2008 | Zhan et al. |
| 2008/0142276 A1 | 6/2008 | Griffo et al. |
| 2008/0156544 A1 | 7/2008 | Singh et al. |
| 2008/0206576 A1 | 8/2008 | Qian et al. |
| 2010/0236836 A1 * | 9/2010 | Voronin ....................... 175/426 |

FOREIGN PATENT DOCUMENTS

| | | |
|---|---|---|
| DE | 38 18 213 | 11/1989 |
| DE | 40 39 217 | 6/1992 |
| DE | 19 821 147 | 11/1999 |
| DE | 10 163 717 | 5/2003 |
| EP | 0 295 151 | 6/1988 |
| EP | 0 412 287 | 2/1991 |
| GB | 2 004 315 | 3/1979 |
| GB | 2 037 223 | 7/1980 |
| JP | 5-280273 | 10/1993 |

OTHER PUBLICATIONS

International search report for PCT/US2007/075670, published Feb. 5, 2009.

International Report on Patentability Chapter I for PCT/US07/75670, mailed Nov. 17, 2009, 6 pages.

International Preliminary Report on Patentability Chapter II for PCT/US07/75670, completed Aug. 24, 2009, 4 pages.

* cited by examiner

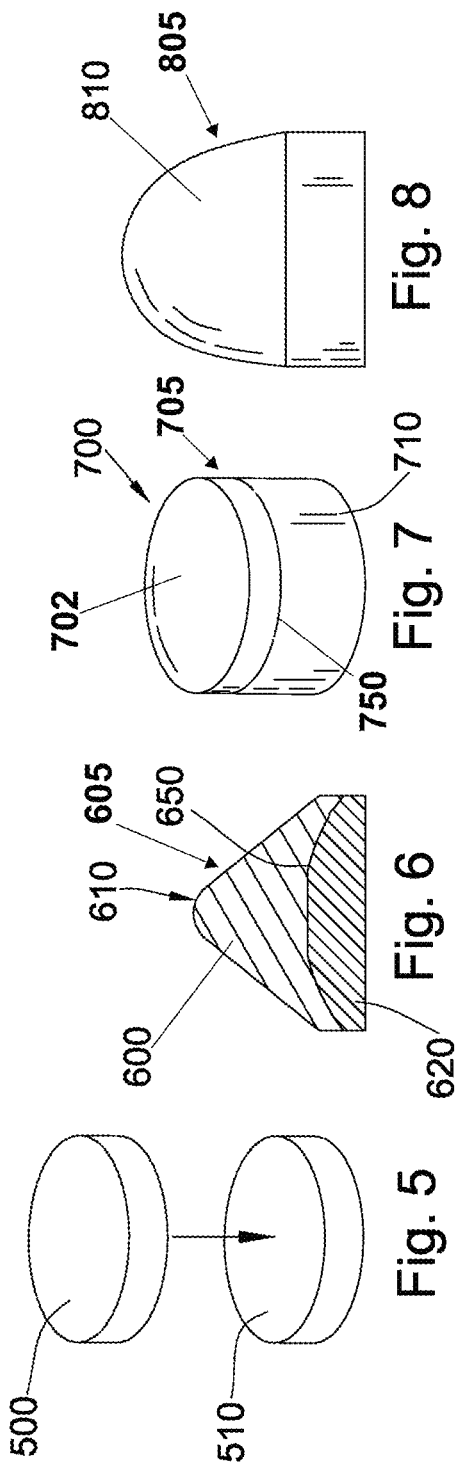

DENSE DIAMOND BODY

CROSS REFERENCE TO RELATED APPLICATIONS

This application is a continuation-in-part of U.S. patent application Ser. No. 11/691,978 filed on Mar. 27, 2007 and that issued as U.S. Pat. No. 7,588,102 on Sep. 15, 2009, which is a continuation-in-part of U.S. patent application Ser. No. 11/673,634 filed on Feb. 12, 2007 and that issued as U.S. Pat. No. 8,109,349 on Feb. 7, 2012, which is a continuation-in-part of U.S. patent application Ser. No. 11/668,254 filed on Jan. 29, 2007 and that issued as U.S. Pat. No. 7,353,893 on Apr. 8, 2008, which is a continuation-in-part of U.S. patent application Ser. No. 11/553,338 filed on Oct. 26, 2006 and that issued as U.S. Pat. No. 7,665,552 on Feb. 23, 2010. All of these applications are herein incorporated by reference for all that they contain.

BACKGROUND OF THE INVENTION

The present invention relates to a method of making a dense, highly impact resistive and/or thermally conductive diamond body.

The prior art includes U.S. Pat. No. 5,266,236, which discloses a method of making a thermally stable, dense and electrically conductive diamond compacts. The method comprises infiltrating a mass of diamond crystals with a silicon infiltrant in the presence of boron under conditions comprising a temperature of not substantially above 1200 degree C. and a pressure of not substantially above 45 Kbar. The resulting compact contains diamond-to-diamond bonding. The boron can be provided in the form of boron-doped diamond. Alternatively, a boron-silicon alloy can be used for infiltrating boron-doped or undoped diamond. Further, boron can be added as elemental boron or $B_4C$ with silicon for infiltration. Alternatively, boron metal catalyst plus silicon infiltration can be used for boron-doped or undoped diamond. Combinations of these mass forming a network composed of silicon carbide by reaction of the silicon with diamond-carbon. The reaction leaves a sintered body composed of boron-doped diamond or boron compounds with diamond or a network of silicon carbide and silicon.

U.S. Pat. No. 5,127,923 discloses that an abrasive compact with a substantially solid body is provided from a mass of abrasive particles which are bonded together on a particle-to-particle basis. A network of interstices is formed within the body by removing the metallic second phase by-product of a solvent catalyst sintering aid. The network of interstices is filled with the carbide by product of a non-catalyst sintering aid forming a solid body. A substrate is bonded to some of the particles and to some of the carbide filling the network of interstices.

Other references from the prior art include U.S. Pat. No. 4,231,762 to Hara et al., U.S. patent application Ser. No. 12/366,706 to Hall, U.S. Pat. No. 4,931,068 to Dismukes et al., U.S. Pat. No. 5,151,107 to Cho et al., and U.S. Pat. No. 4,948,388 to Ringwood, which are all herein incorporated by reference for all they contain.

BRIEF SUMMARY OF THE INVENTION

In one aspect of the invention, a method of making a dense diamond body comprises the steps of: forming a sintered polycrystalline diamond body with the use of a catalyst; forming voids in the body by removing at least some of the catalyst; and reducing the overall volume of the voids by applying pressure and temperature to the body in a vessel substantially free of additional catalysts.

The step of forming the sintered polycrystalline diamond may include sintering multiple diamond bodies in a single can at the same time. The temperature for removing the voids may be at least 1000 degree Celsius. The pressure may be at least 3 GPa. The steps of forming voids may include leaching of catalyst material. The method may include an additional step of bonding the diamond body to a cemented metal carbide substrate after the step of reducing the overall volume of the body's voids. An infiltrant barrier may be placed intermediate the substrate and the diamond body. The step of bonding the diamond body to a substrate may be done in a press at a temperature lower than 1600 degree Celsius. The step of bonding the diamond body to a substrate may be done in a press at a pressure lower than 7 GPa.

The diamond bodies may be separated by a metal layer that has a melting temperature above the temperature applied in the step to reduce the overall volume. The vessel may be surrounded by a pressure transferring medium that is pre-compacted at a temperature less than 500 degree Celsius and a pressure of less than 1 GPa.

The diamond body may comprise portions with different geometries including: a substantially conical shaped geometry, a substantially cylindrical shape, a substantially chisel-shaped geometry, and/or a substantially dome-shaped geometry.

In some embodiments, at least 25 percent of the catalyst may be removed. In other embodiments, at least 90 percent of the catalyst may be removed. In yet other embodiments, at least 99 percent of the catalyst may be removed. The method may include an additional step of attaching the diamond to an electric component or to a driving mechanism.

BRIEF DESCRIPTION OF THE DRAWINGS

FIG. 5 is a perspective diagram of an embodiment of a polycrystalline diamond disc and a metallic substrate.

FIG. 6 is a cross-sectional diagram of an embodiment of a diamond body.

FIG. 7 is a perspective diagram of an embodiment of a diamond body.

FIG. 8 is an orthogonal diagram of an embodiment of a diamond body.

FIG. 9 is an orthogonal diagram of an embodiment of a diamond body.

FIG. 10 is an exploded, cross-sectional diagram of an embodiment of a diamond body.

FIG. 11 is an exploded, cross-sectional diagram of an embodiment of a diamond body.

DETAILED DESCRIPTION OF THE INVENTION AND THE PREFERRED EMBODIMENT

Figure 1:
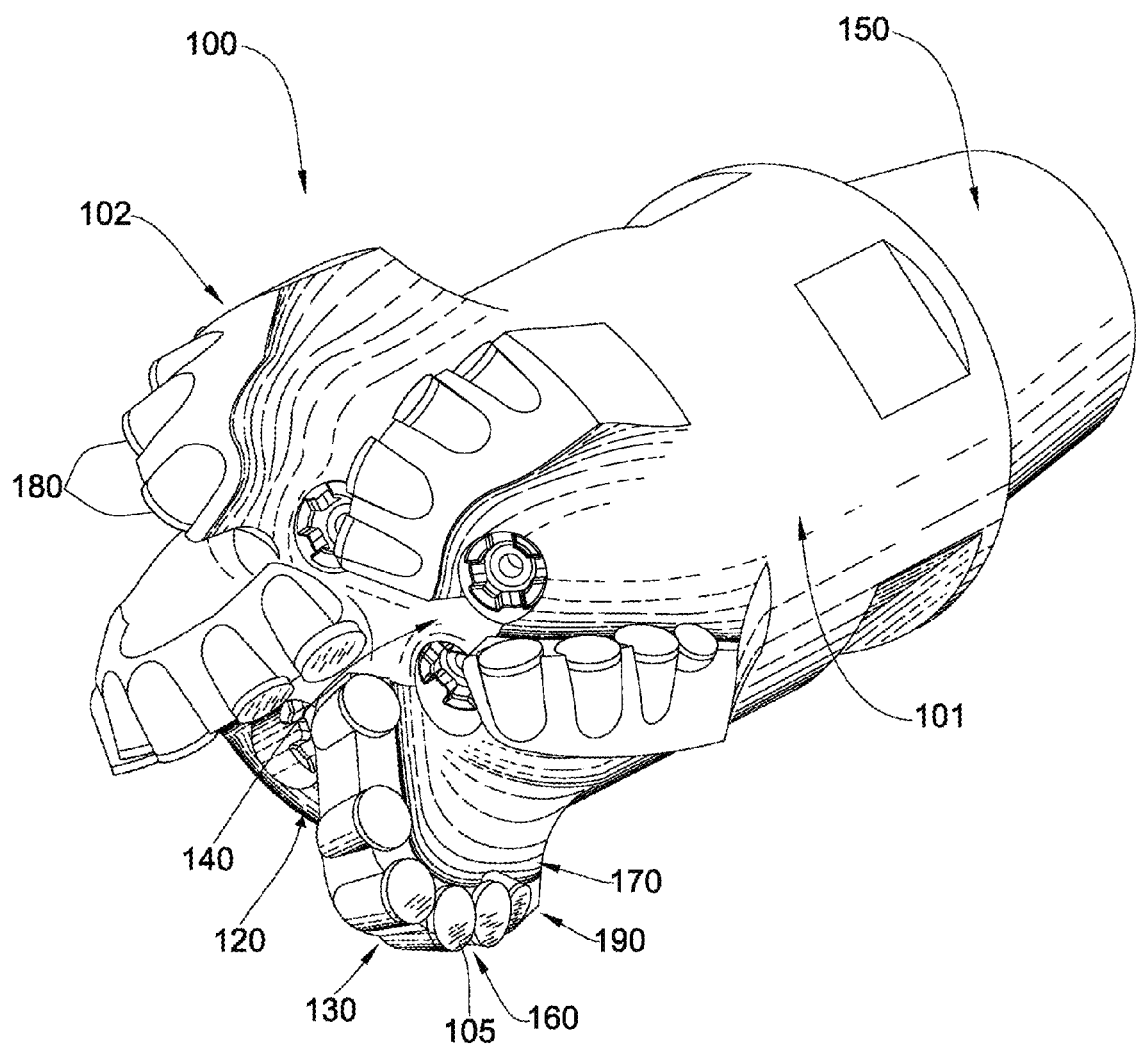
FIG. 1 is a perspective diagram of an embodiment of a drill bit with cutters.

FIG. 1 discloses a drill bit 100 that incorporates diamond enhanced cutters, or shear cutters, 105. A bit body 101 is attached to a shank 150 and comprises an end which forms a working face 102. Several blades 170 extend outwardly from the bit body 101, each of which comprises a plurality of shear cutters 105. Preferably the drill bit 100 will have between three and seven blades 170. The blades 170 collectively form an inverted conical region 140. Each blade 170 may have a cone portion 120, a nose 130, a flank portion 160, and a gauge portion 190. Shear cutters 105 may be arrayed along any portion of the blades 170, including the cone portion 120, nose 130, flank portion 160, and gauge portion 190.

The diamond enhanced shear cutters 105 reduce wear on the bit face 102 and blades 170 as the bit 100 advances further into subterranean formations. The shear cutters 105 have a diamond body 180 bonded to a substrate, preferably made of cemented metal carbide. The shear cutters 105 are attached to the blade 170, usually by brazing, although in alternative embodiments welding or press fitting may be used.

Figure 2:
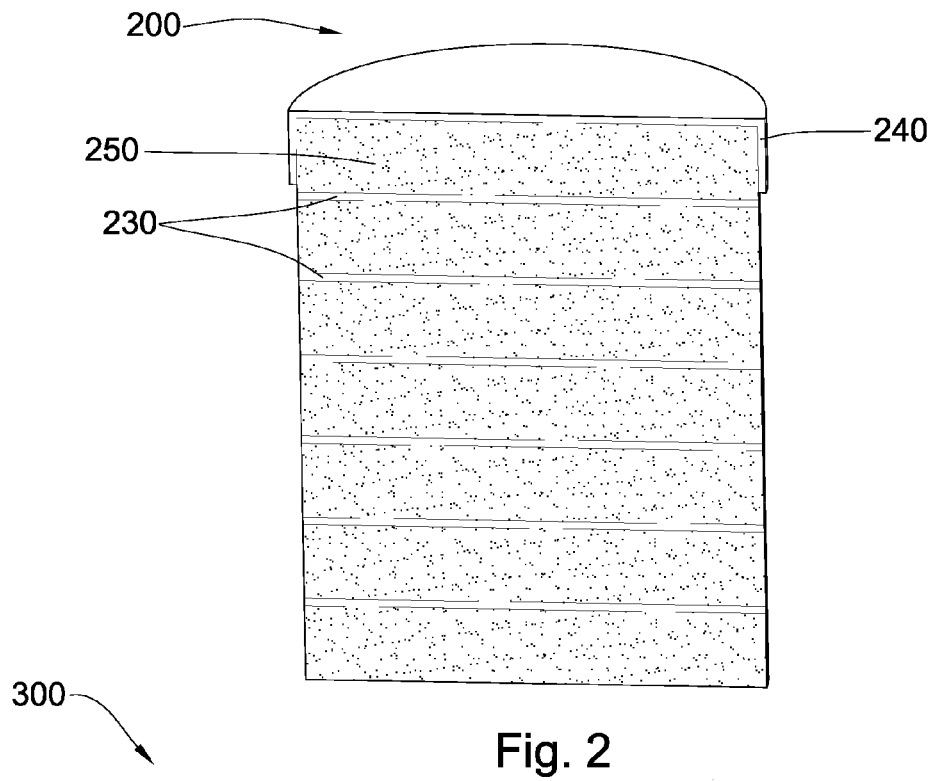
FIG. 2 is a cross-sectional diagram of an embodiment of a can containing multiple layers of diamond.

FIG. 2 discloses a can 200 containing diamond mixes 250 separated into layers. The mixes 250 mostly comprise a plurality of diamond grains mixed with a small amount of metal catalyst. The catalyst may be selected from a group of materials consisting of cobalt, nickel, iron, ruthenium, rhodium, palladium, chromium, manganese, tantalum, osmium, iridium, or combinations thereof. In some embodiments, a cemented metal carbide disc may be incorporated into each of the layer and provide a metal catalyst source. In other embodiments, the mixes 250 may comprise non-metallic catalysts that are capable of removal in later stages of the manufacturing process. The non-metallic catalyst may include silicon, silicon carbide, boron, carbonates, hydroxide, hydride, hydrate, phosphorus oxide, phosphoric acid, carbonate, lanthanide, actinide, phosphate hydrate, hydrogen phosphate, phosphorus carbonate, or combinations thereof.

In some embodiments, only a single layer of diamond is contained in the can 200. Regardless of the number of the layers in the can, the diamond mixes 250 should be thoroughly cleaned before sealing the can's lid 240 in place. The cleansing process may include heating the can 200 in a substantially inert atmosphere or a vacuum to vent the impurities out of the can 200. When the mixes 250 are believed to be cleansed, the temperature may be increased for a short duration to melt a sealant material between the can 200 and the lid 240, thereby sealing them together. A compatible sealing method that may be compatible with the present invention is described in U.S. patent application Ser. No. 11/469,229, which is herein incorporated by reference for all that it discloses.

In embodiments where a plurality of diamond mixes 250 is divided into layers, niobium disks 230 may be used as separators. Niobium is a preferred metal because of its high melting temperature, relatively low cost, and chemical activity toward volatile impurities that may remain in the diamond mixes 250.

Figure 3:
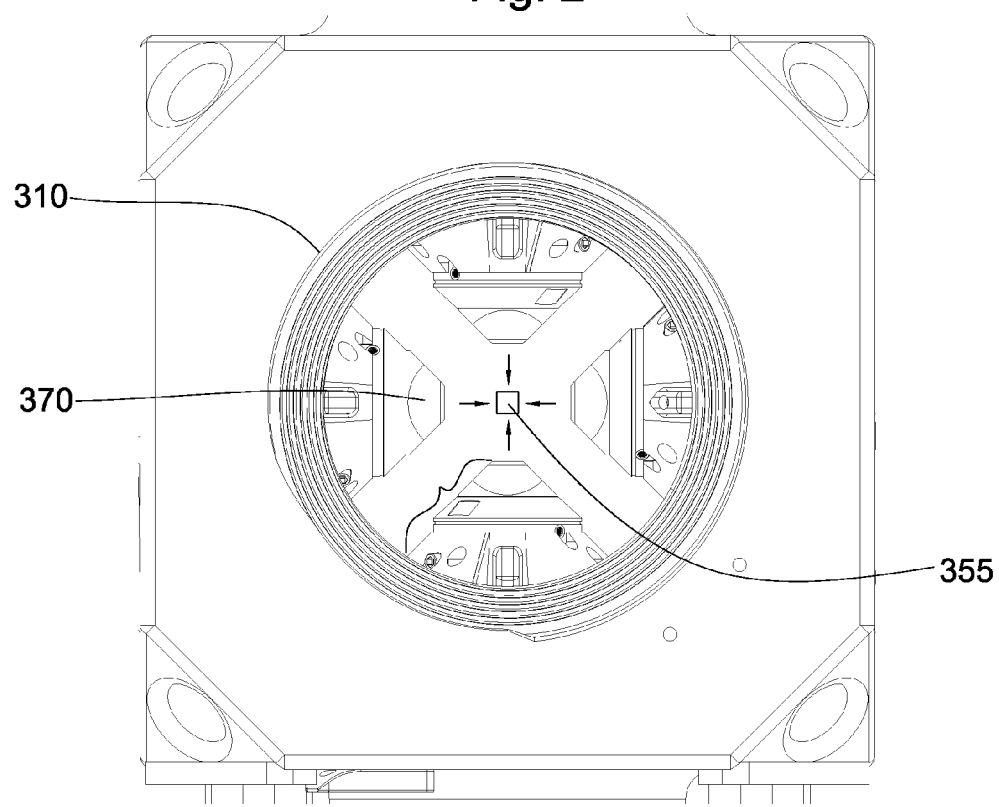
FIG. 3 is an orthogonal diagram of an embodiment of a high-pressure/high-temperature press chamber.

FIG. 3 discloses an internal reaction chamber 300 of a unitary frame press with a cartridge removed for illustrative purposes. The other cartridges are attached to the frame in coaxial openings 310. The forward end of each cartridge comprises a hydraulically moveable anvil 370, typically made of tungsten carbide or any other cemented metal carbide.

Preferably, the can 200 described above is placed in this chamber 300 after the cleaning process is complete. Typically, the can 300 will be first packed into the cavity of a deformable cube 355 together with a pressure transferring medium such as a salt, usually sodium chloride. As the anvils 370 advance together, the deformable material extrudes into the gaps between the anvil edges and forms a gasket. A reaction cell within cube 355 is heated to high temperature by conducting electricity between two opposing anvils 370 with a resistive heater inside the cube 355, completing the electrical circuit. The pressure transferring medium within the cube 355 acts to uniformly distribute the pressure from the advanced anvils 370 to the diamond mixes 250. Under such high pressure and temperature, the catalysts in the diamond mixes 250 promote diamond-to-diamond bonding resulting in a sintered polycrystalline diamond body with a metal catalyst dispersed through interstices of the bonded diamond grains.

Figure 4A:
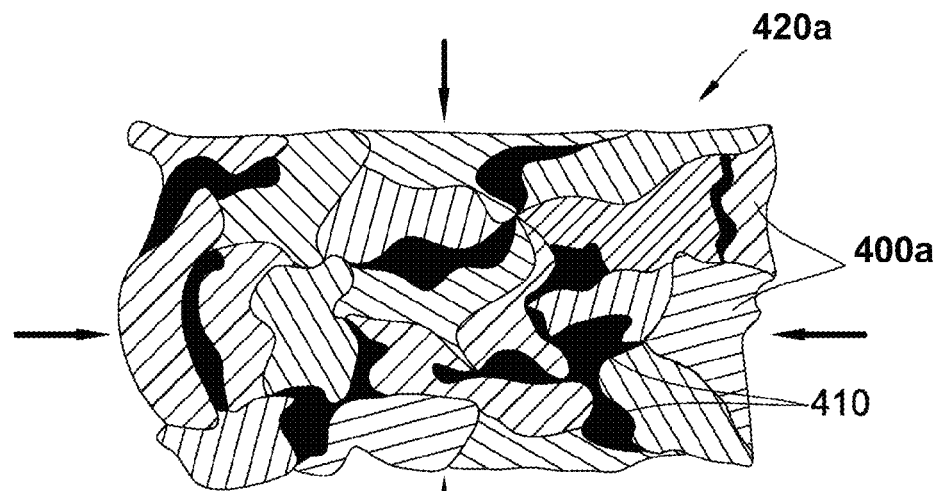
FIG. 4a is a schematic diagram of an embodiment of a polycrystalline diamond segment.

FIG. 4a discloses a cross-sectional view of a diamond body 420a after sintering in the internal chamber 300. The diamond body 420a comprises polycrystalline diamond grains 400a bonded together with interstitial regions filled with a metal catalyst 410. During sintering, external pressure pushed the diamond grains 400a close together until the diamond/metal composite was as dense as possible. Under such pressure, it is believed that the metal catalyst 410 actually resisted attainment of a denser diamond product by reactively pushing back on the diamond grains 400a.

Figure 4B:
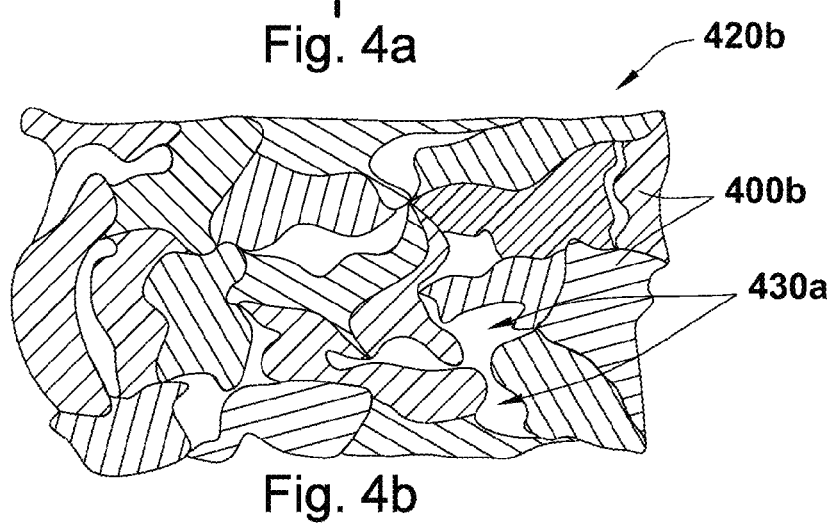
FIG. 4b is a schematic diagram of another embodiment of a polycrystalline diamond segment.

FIG. 4b discloses a sintered diamond body 420b with polycrystalline diamond grains 400b with the catalyst removed, thereby creating voids 430a that were previously occupied with catalyst. In the preferred embodiment, all of the catalyst is removed; however, in some alternative embodiments, only a portion of the catalyst is removed. For illustrative example, in some embodiments only 25, 90, or 99 percent of the catalyst is removed. The amount of catalyst removed may range from 1 to 100 percent. The catalyst may be removed through a chemical leaching process or by other removal mechanisms known in the art. Leaching agents that may be compatible with the present invention may include acids, particularly a mixture of hydrofluoric acid and nitric acid or alkali aqueous solutions. Other catalyst removal mechanisms may include electrolytic leaching or sputtering.

Figure 4C:
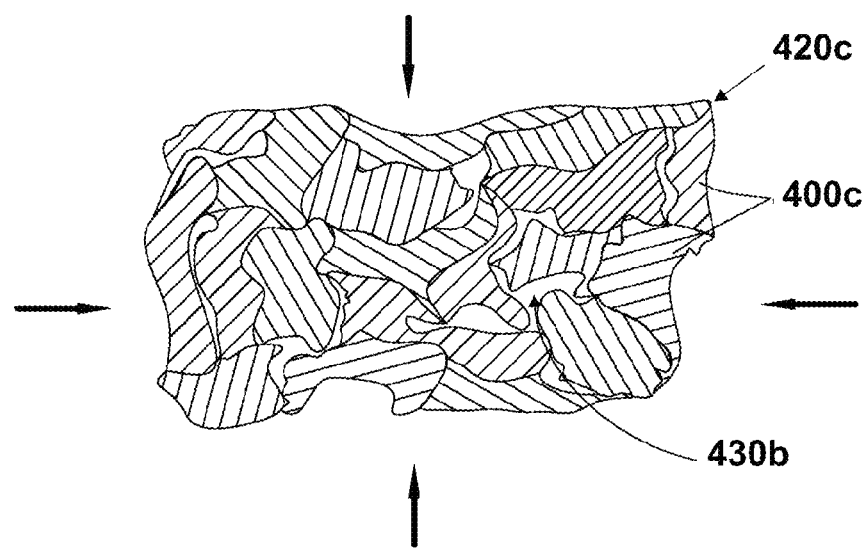
FIG. 4c is a schematic diagram of another embodiment of a polycrystalline diamond segment.

FIG. 4c discloses recompacting the sintered diamond body 420c with polycrystalline diamond grains 400c and voids 430b after the catalyst is removed. It is believed that without resistance from the catalyst to the external pressure applied to the diamond bodies, that the bodies may become denser and result in a fully dense polycrystalline diamond body. In embodiments where only a portion of the catalyst is removed, it is believed that the diamond body will still achieve higher overall density than was previously possible.

The recompacting may be done in the internal chamber 300 at high temperatures and pressures. The diamond bodies are preferably disposed within a vessel substantially free of any metal catalyst. A vessel made of niobium may be preferable because of niobium's high melting temperature. In some embodiments, a small amount of catalyst, substantially smaller in volume than the total volume occupied by the voids after catalysts removal, may also be placed in the vessel to promote new diamond-to-diamond bonding during recompaction. In embodiments, where only a portion of the catalyst was removed, the remaining catalyst may be sufficient to promote the new bonds.

Before recompacting the diamond bodies, they may be pre-compacted in the internal chamber 300 by the advancement of the anvils 370. Preferably, no temperature is applied in this step. The pre-compacting is believed to further help condense the diamond body 420c.

FIG. 5 discloses a polycrystalline diamond body 500 and a metallic substrate 510. Due to diamond's inert characteristics, it may be preferable to attach the polycrystalline diamond body 500 to a metallic substrate 510 after the polycrystalline diamond body 500 is made either fully dense or substantially denser. This step may also be done in the internal chamber 300. The temperature and pressures in this step may be just enough to promote the bonding between the polycrystalline diamond body 500 and the metallic substrate 510. It is believed that metal catalyst from the metallic substrate 510 will be prevented from infiltrating the polycrystalline diamond body 500 because of its high density. However, a little infiltration may occur in some embodiments, especially proximate the diamond/substrate interface, which may be beneficial for attachment. This step may be performed at a temperature lower than 1600 degree Celsius and a pressure lower than 7 GPa. In some embodiments, the polycrystalline diamond body 500 and the metallic substrate 510 may be bonded at substantially atmospheric pressure, but under high temperature. Such an embodiment is described in U.S. patent application Ser. No. 12/492,804, "Bonded Assembly with Low Residual Stress," by the inventors named herein, which is herein incorporated by reference for all that it discloses.

FIG. 6 discloses a diamond body 600 with a portion comprising a substantially conical geometry 605. The diamond body 600 may comprise a thickness from the apex 610 of the substantially conical geometry 605 to an interface 650. The thickness may be greater than 0.100 inches. The conical side walls may form an angle with the central axis of the diamond body 600 between 35 to 55 degrees, but preferably 45 degrees. The curvature of the apex 610 may also form a 0.050 to 0.120 inch radius. The dense diamond body 600 may be bonded with a metallic substrate 620 at the non-planar interface 650.

FIG. 7 discloses a shear cutter 700 with a cutting surface comprising a dense diamond body or compact 702. The diamond body may comprise a substantially cylindrical shape 705. The diamond body 702 may be bonded with a metallic substrate 710 at a non-planar interface 750. FIG. 8 discloses a diamond body 810 with a portion comprising a substantially dome-shaped geometry 805. FIG. 9 discloses a diamond body 900 comprising a substantially chisel-shaped geometry 905, which may be compatible for use on a roller cone bit.

FIG. 10 discloses dense diamond body 1000 bonded to a polycrystalline diamond body or layer 1010 that incorporates a catalyst. In some embodiments, some catalysts may infiltrate into the dense diamond surface 1005 adjacent to the polycrystalline diamond body 1010 while making a bond. The polycrystalline diamond body 1010 may be further bonded with a metallic or metal carbide substrate 1020. The bonding of these layers may occur simultaneously in the internal chamber 300 of the high temperature and high pressure press or may be carried out at substantially atmospheric pressure.

FIG. 11 discloses a dense diamond body 1130 bonded to a polycrystalline layer 1100 which has not had its catalyst removed. In this embodiment, the dense diamond body 1130 only forms the apex 1110. A composite tool comprising both dense diamond parts and prior-art catalyst-containing parts may be less expensive to manufacture.

Figure 12:
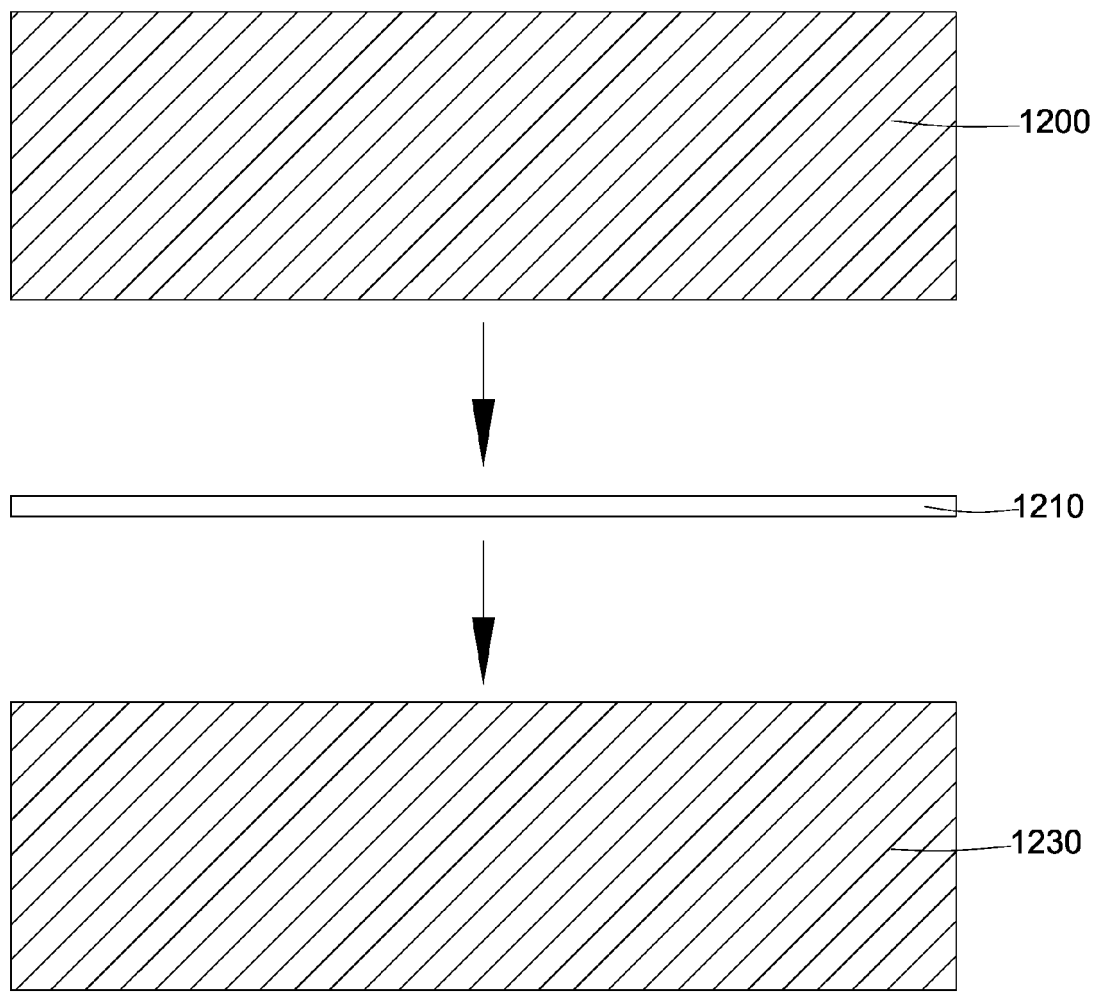
FIG. 12 is a cross-sectional diagram of another embodiment of a diamond body.
Figure 13:
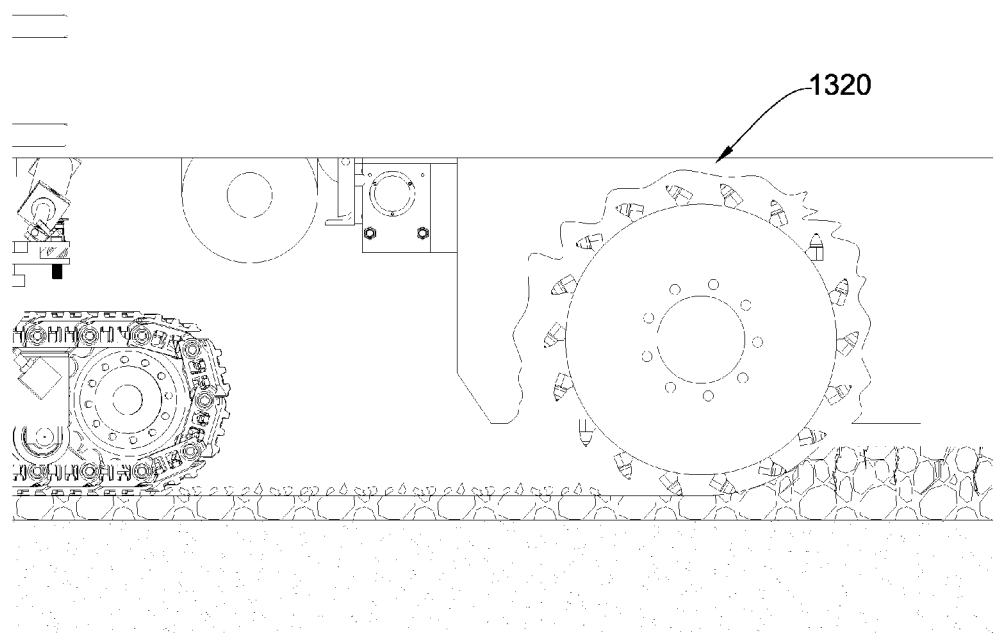
FIG. 13 is an orthogonal diagram of an embodiment of a milling drum.
Figure 14:
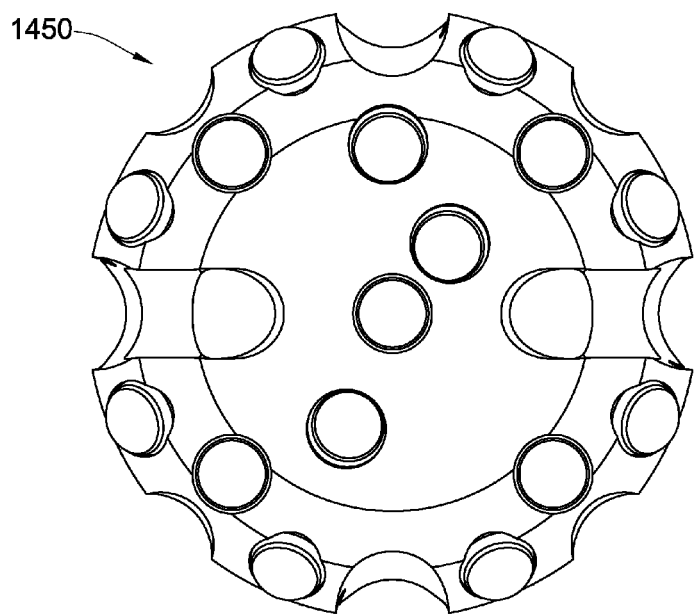
FIG. 14 is an orthogonal diagram of an embodiment of a percussion drill bit.
Figure 15:
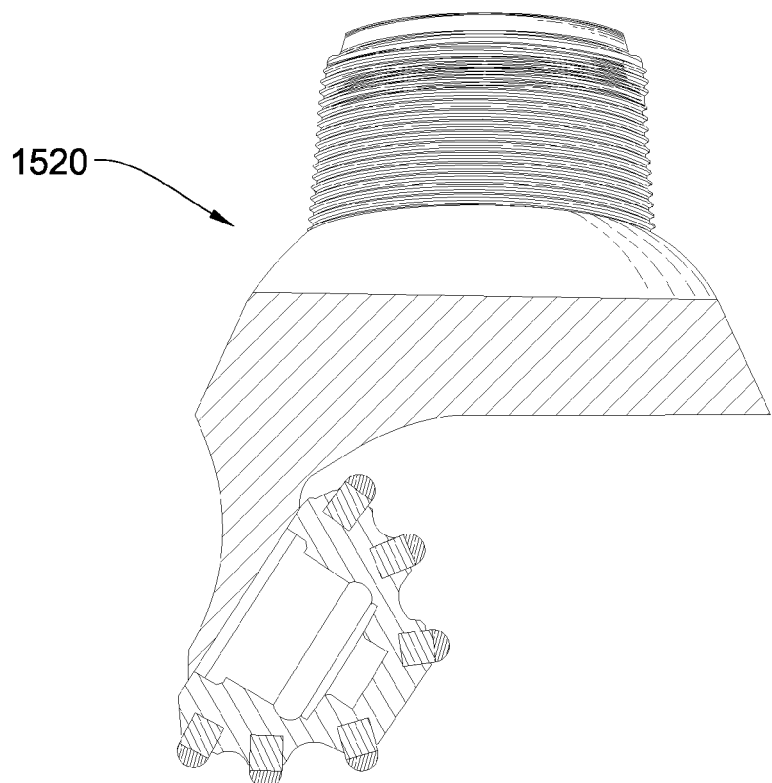
FIG. 15 is a cross-sectional diagram of an embodiment of a roller cone bit.
Figure 16:
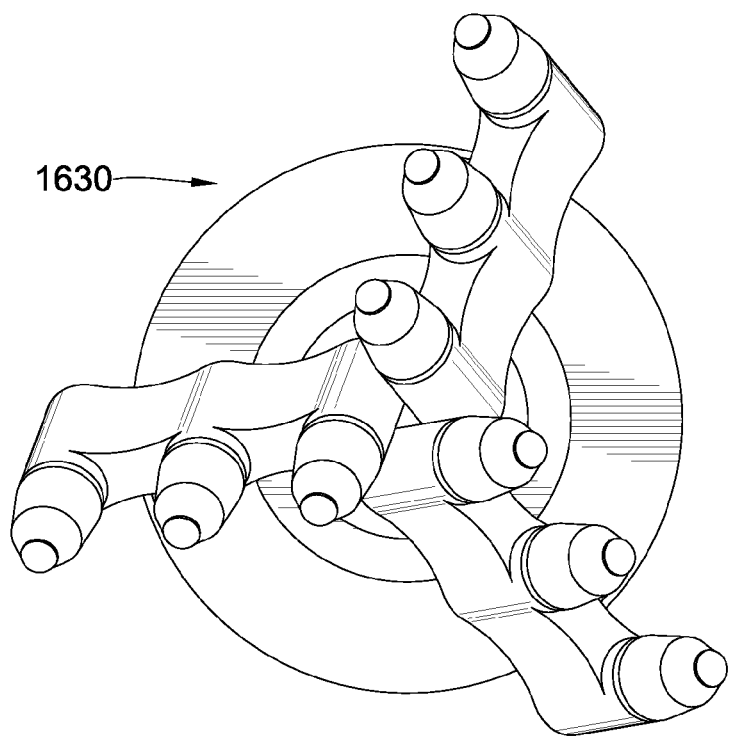
FIG. 16 is an orthogonal diagram of an embodiment of a drill bit.
Figure 17:
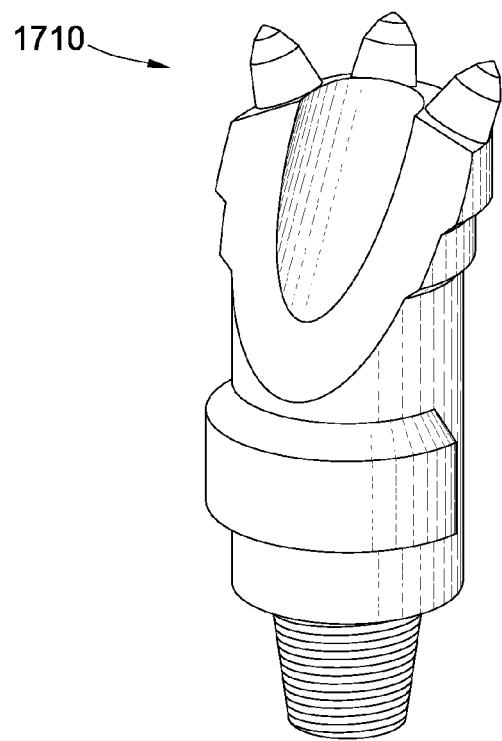
FIG. 17 is a perspective diagram of an embodiment of a horizontal drill bit.
Figure 18:
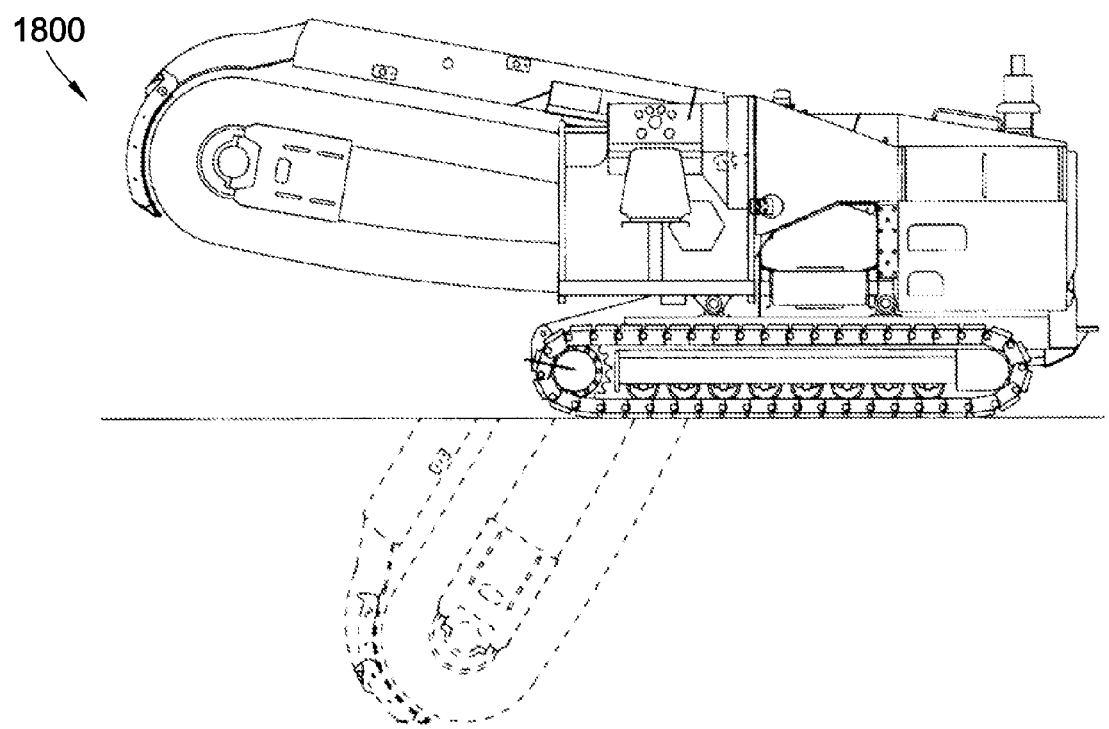
FIG. 18 is an orthogonal diagram of an embodiment of a trenching machine.

FIG. 12 discloses an infiltrant barrier 1210 between a diamond body 1200 that is to be densified and a substrate 1230. The infiltrant barrier 1210 substantially prevents catalyst from entering the diamond body 1200 from the substrate 1230 when attaching them together in the internal chamber 300. The infiltrant barrier 1210 may be a thin foil of a refractory metal, such as niobium.

FIGS. 13-23 depict the current invention in various embodiments. The dense diamond body may be incorporated into a driving mechanism, such as a milling drum 1320 in FIG. 13; a milling pick; a percussion bit 1450 in FIG. 14; a roller cone bit 1520 in FIG. 15; a mining bit 1630 in FIG. 16; a horizontal drilling bit 1710 in FIG. 17; or a trenching machine 1800 in FIG. 18.

Figure 19:
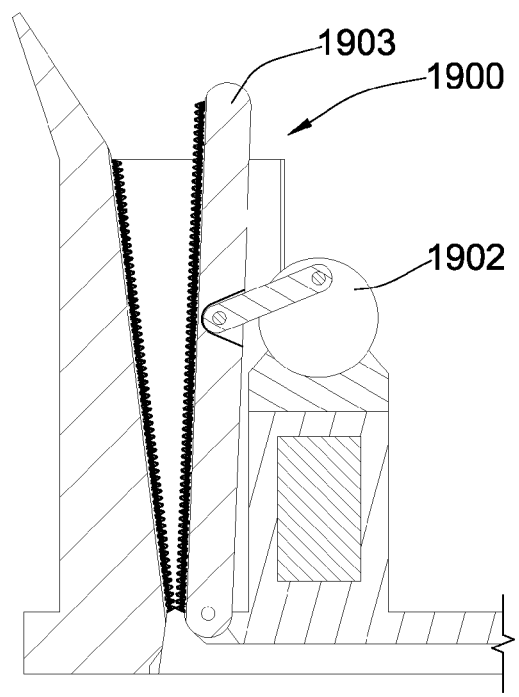
FIG. 19 is a cross-sectional diagram of an embodiment of a jaw crusher.

FIG. 19 discloses the dense diamond incorporated in a jaw crusher 1900. The crusher 1900 may comprise a cam 1902 attached to a wall 1903 of the machine 1900. As the cam 1902 moves it may force the crushing surfaces to crush material between them.

Figure 20:
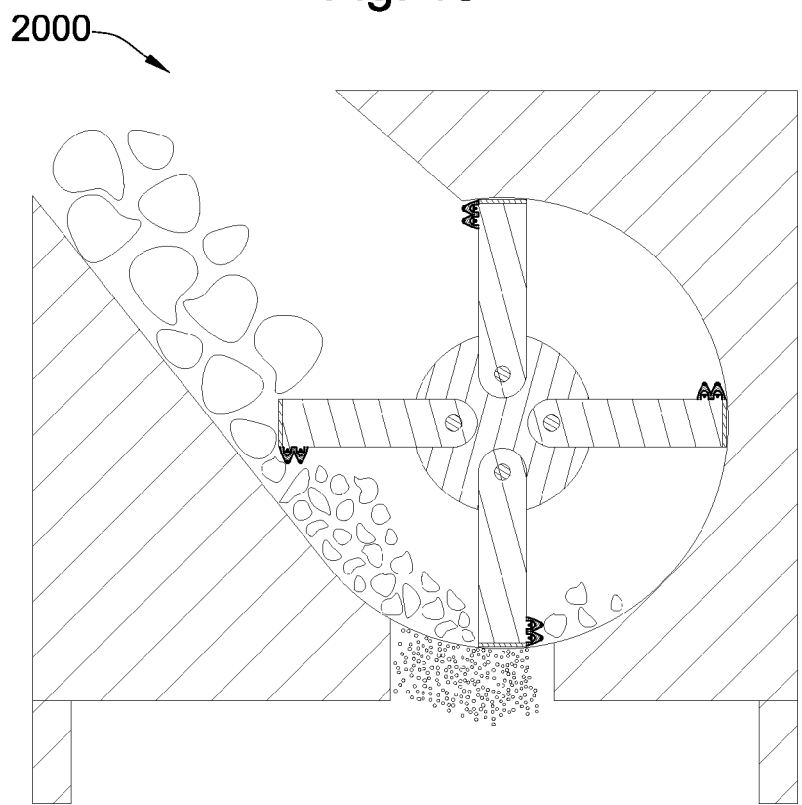
FIG. 20 is a cross-sectional diagram of an embodiment of a rotary mill.

FIG. 20 discloses a rotary mill 2000. A rotary mill that may be compatible with the present invention is disclosed in U.S. Pat. No. 7,416,145 and is hereby incorporated for all that it discloses.

Figure 21:
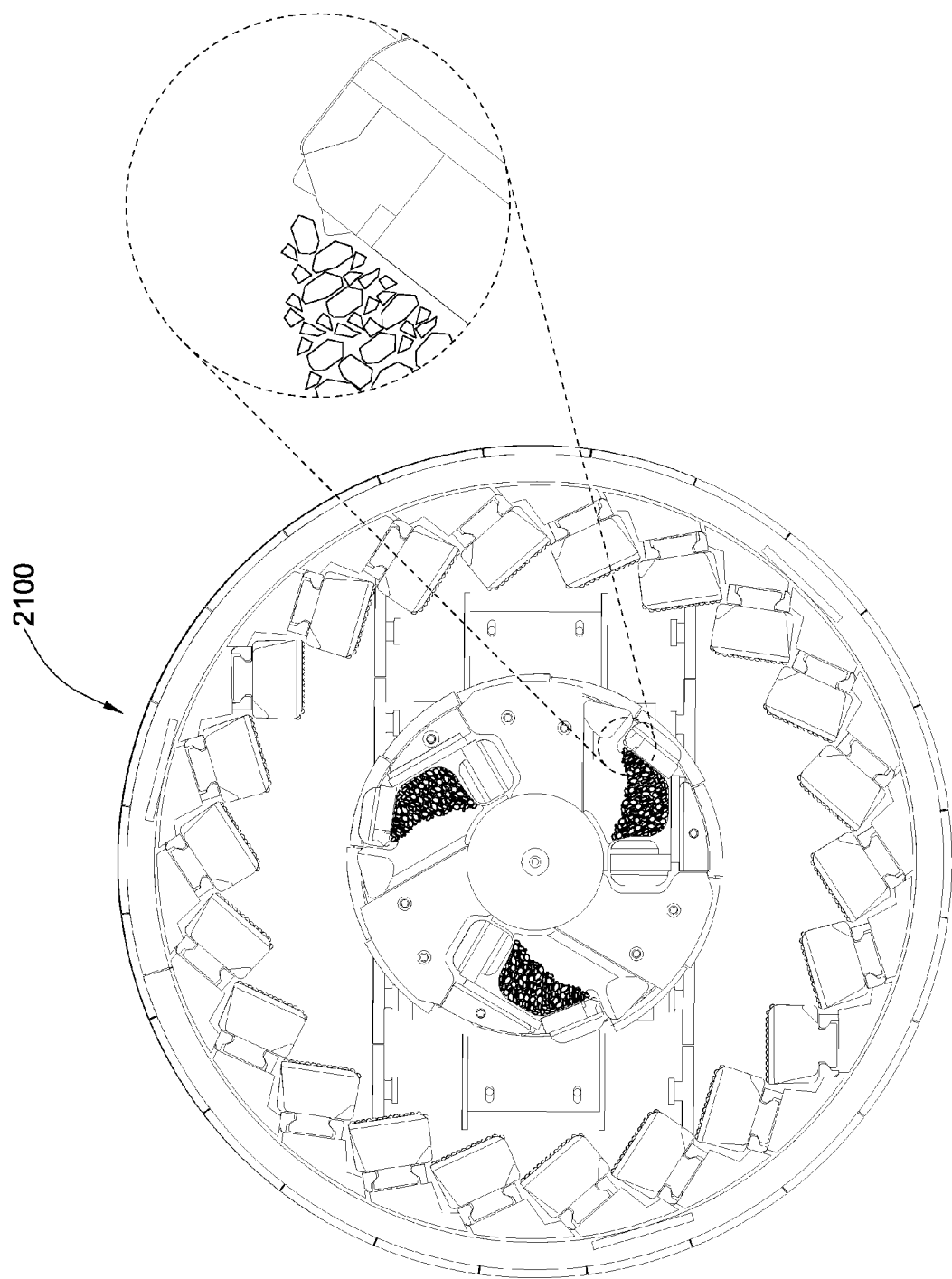
FIG. 21 is an orthogonal diagram of an embodiment of a rotary impactor.

FIG. 21 discloses a shaft impactor 2100. An impactor that may be compatible with the present invention is disclosed in U.S. patent application Ser. No. 11/534,177 and is herein incorporated for all that it discloses.

Figure 22:
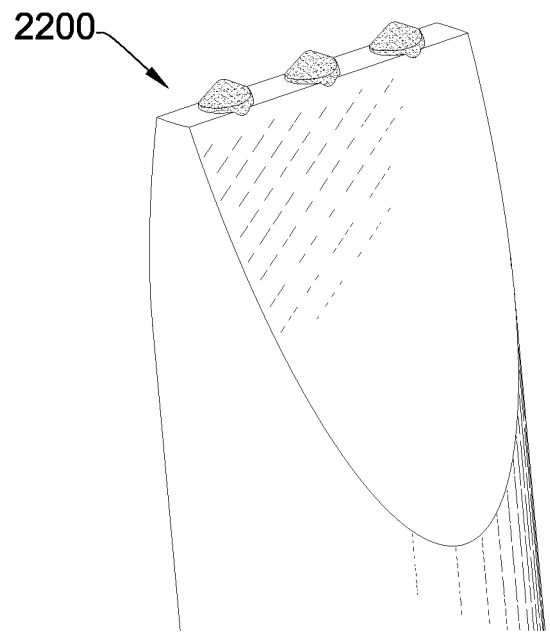
FIG. 22 is a perspective diagram of an embodiment of a chisel.
Figure 23:
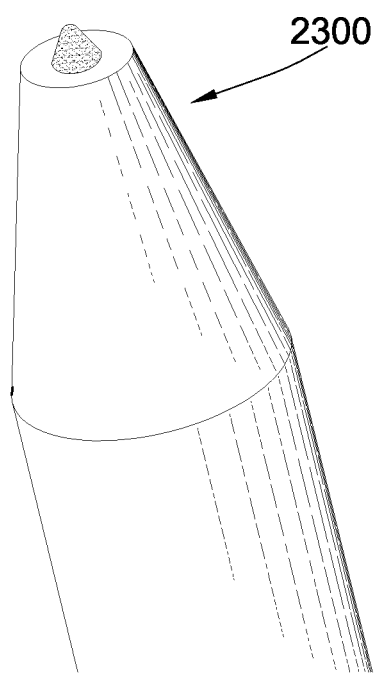
FIG. 23 is a perspective diagram of another embodiment of a moil.

FIGS. 22 and 23 disclose the dense diamond body incorporated in a chisel 2200 and a moil 2300, respectively. A chisel or moil that may be compatible with the present invention is disclosed in U.S. Pat. No. 7,503,628 and is herein incorporated for all that it discloses.

Figure 24:
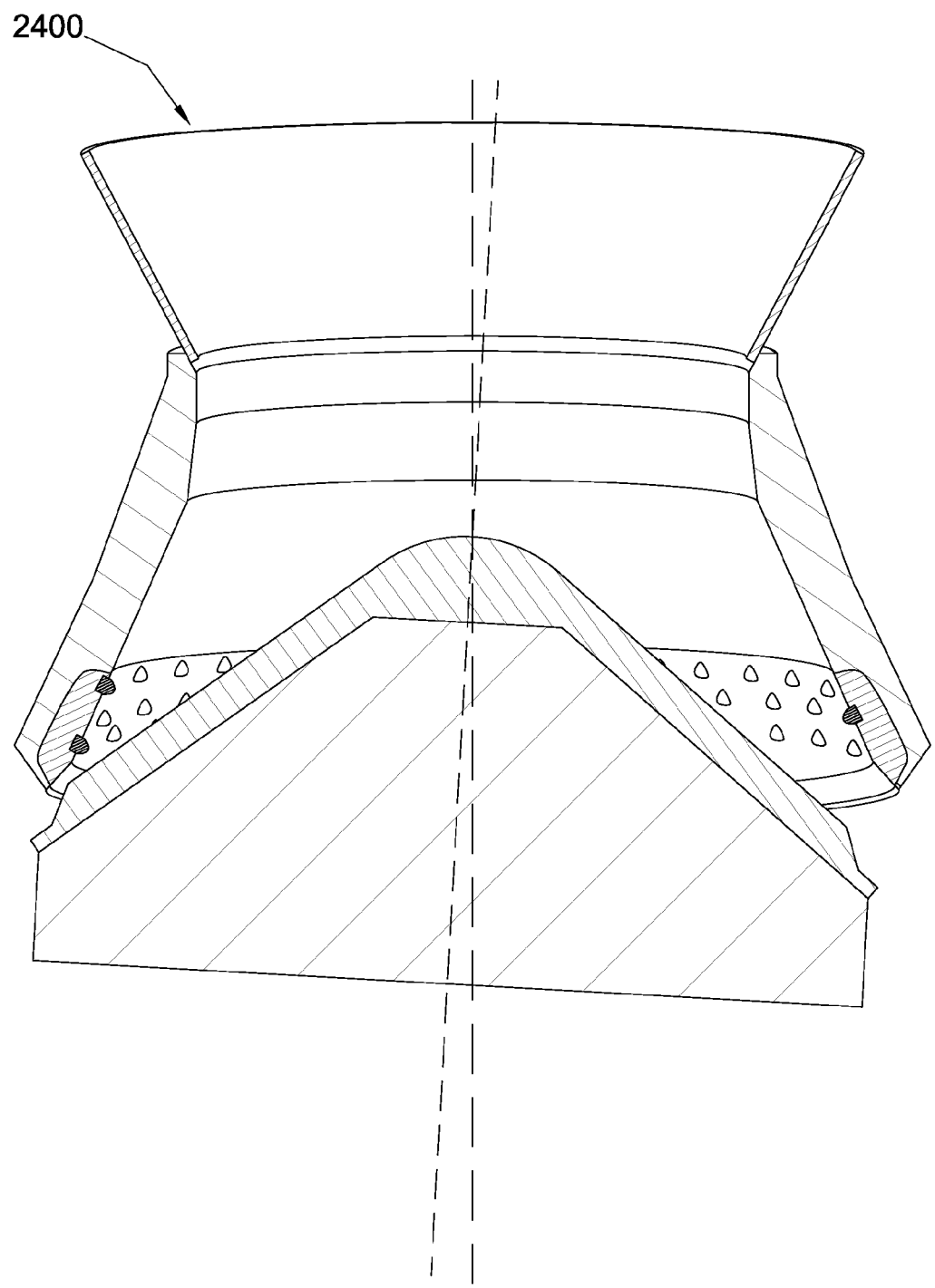
FIG. 24 is a cross-sectional diagram of an embodiment of a cone crusher.

FIG. 24 discloses a cone crusher 2400 incorporating the dense diamond bodies. A cone crusher that may be compatible with the present invention is disclosed in U.S. Patent Publication No. 2008/0041994 and is herein incorporated for all that it discloses.

Figure 25:
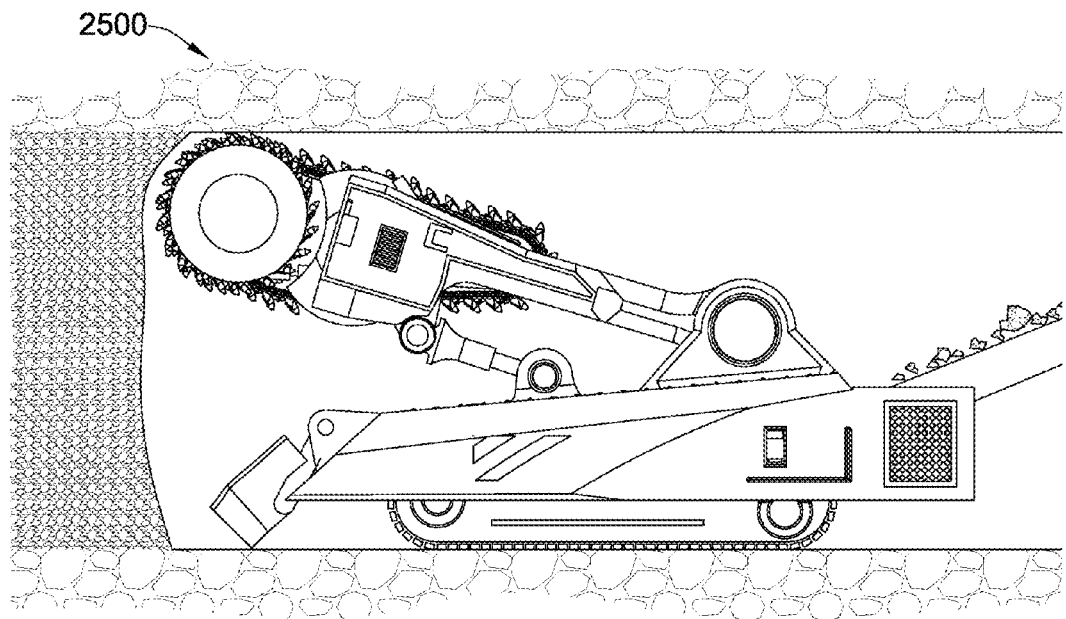
FIG. 25 is an orthogonal diagram of an embodiment of a mining machine.

FIG. 25 discloses the dense diamond bodies incorporated in a mining machine 2500.

Figure 26:
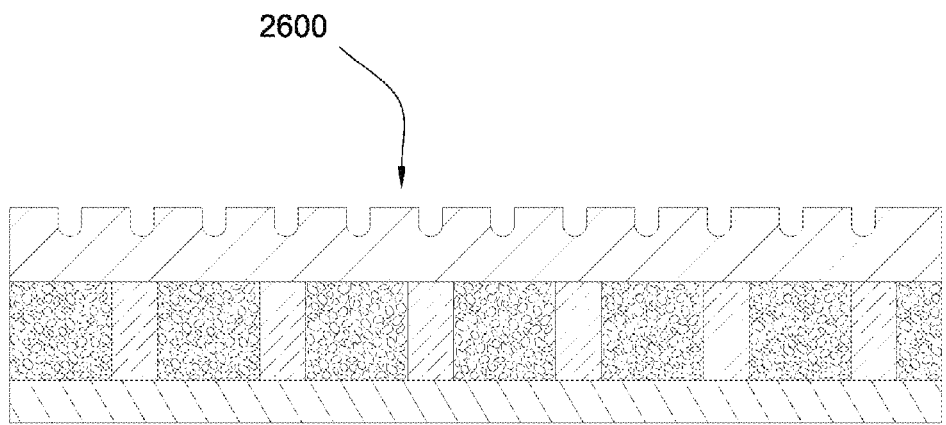
FIG. 26 is a cross-sectional diagram of an embodiment of a heat spreader.

Referring to FIG. 26, the method of making a dense diamond compact may include an additional step of attaching the diamond body to an electrical component. The electrical component may comprise discrete locations capable of generating high temperatures, such as on a circuit board 2600. The dense diamond bodies may be used as heat spreaders to draw the heat away from the electrical components. A heat spreader that may be modified to include the present invention is disclosed in U.S. patent application Ser. No. 11/426,255 to Hall, which is herein incorporated by reference for all that it discloses.

Whereas the present invention has been described in particular relation to the drawings attached hereto, it should be understood that other and further modifications apart from those shown or suggested herein, may be made within the scope and spirit of the present invention.

What is claimed is:

1. A method of making a dense diamond body, comprising:
    forming a sintered polycrystalline diamond body with the use of a catalyst;
    forming voids having a volume in the sintered polycrystalline diamond body by removing at least some of the catalyst; and
    reducing the volume of voids by applying a pressure and a temperature to the sintered polycrystalline diamond body in a vessel substantially free of additional catalysts and substantially free of a carbide substrate to make the dense diamond body.

2. The method of claim 1, wherein the temperature is at least 1000 degrees Celsius.

3. The method of claim 1, wherein the pressure is at least 3 GPa.

4. The method of claim 1, wherein forming voids includes leaching the catalyst material.

5. The method of claim 1, further comprising bonding the dense diamond body to a cemented metal carbide substrate after reducing the volume of the voids.

6. The method of claim 5, further comprising placing an infiltrant barrier between the cemented metal carbide substrate and the dense diamond body.

7. The method of claim 5, wherein bonding the dense diamond body to a cemented metal carbide substrate is done in a press at a temperature lower than 1600 degrees Celsius.

8. The method of claim 5, wherein bonding the dense diamond body to a cemented metal carbide substrate is done in a press at a pressure lower than 7 GPa.

9. The method of claim 1, wherein forming the sintered polycrystalline diamond body includes forming multiple sintered polycrystalline diamond bodies in a single can.

10. The method of claim 9, wherein each sintered polycrystalline diamond body is separated from an adjacent sintered polycrystalline diamond body by a metal layer having a melting temperature above the temperature applied while reducing the volume of voids.

11. The method of claim 1, further comprising surrounding the vessel with a pressure transferring medium and pre-compacting the vessel at a temperature less than 500 degrees Celsius and a pressure of less than 1 GPa.

12. The dense diamond body of claim 1, wherein the dense diamond body comprises at least one of a portion with a substantially conical geometry, a substantially cylindrical shape, and a portion with a substantially chisel-shaped geometry.

13. The method of claim 1, further comprising removing at least 99 percent of the catalyst.

14. The method of claim 1, further comprising removing at least 25 percent of the catalyst.

15. The method of claim 1, further comprising attaching the dense diamond body to an electrical component.

16. The method of claim 1, further comprising attaching the dense diamond body to a driving mechanism.

17. The method of claim 1, wherein the dense diamond body is not attached to another body during the reducing.

18. A method of making a dense diamond body, comprising:
    forming a sintered polycrystalline diamond body with the use of a catalyst;
    forming voids having a volume in the sintered polycrystalline diamond body by removing at least some of the catalyst;
    applying a first pressure and a temperature to the sintered polycrystalline diamond body in a vessel to reduce the volume of voids and form the dense diamond body; and
    after reducing the volume of voids, attaching the dense diamond body to a substrate by applying a second pressure and temperature to the dense diamond body and the substrate;
    wherein the dense diamond body is not attached to another body during the applying the first pressure and temperature.

19. A method of making a dense diamond body, comprising:
    forming a sintered polycrystalline diamond body with the use of a catalyst;
    forming voids having a volume in the sintered polycrystalline diamond body by removing at least some of the catalyst;
    applying a pressure and a temperature to the sintered polycrystalline diamond body in a vessel to reduce the volume of voids and form the dense diamond body; and
    bonding the dense diamond body to a polycrystalline diamond layer incorporating a catalyst therein;
    wherein the dense diamond body is not attached to another body during the applying the pressure and temperature.

20. A method of making a dense diamond body, comprising:
    forming a sintered polycrystalline diamond body with the use of a catalyst;
    forming voids having a volume in the sintered polycrystalline diamond body by removing at least some of the catalyst; and
    reducing the volume of voids by precompacting the sintered polycrystalline diamond body by increasing the pressure alone without an increase in temperature followed by application of both pressure and temperature to form the dense diamond body.

* * * * *